United States Patent
Mori et al.

(10) Patent No.: US 7,680,454 B2
(45) Date of Patent: Mar. 16, 2010

(54) WIRELESS NETWORK LOCATED WITHIN A VEHICLE CONTAINING ACCESS POINTS AND TERMINALS FOR WIRELESS COMMUNICATION

(75) Inventors: Keiji Mori, Osaka (JP); Masaaki Higashida, Osaka (JP); Yasuaki Sakanishi, Osaka (JP); Toshihiro Ezaki, Osaka (JP)

(73) Assignee: Panasonic Corporation, Osaka (JP)

( * ) Notice: Subject to any disclaimer, the term of this patent is extended or adjusted under 35 U.S.C. 154(b) by 592 days.

(21) Appl. No.: 11/396,545

(22) Filed: Apr. 4, 2006

(65) Prior Publication Data

US 2006/0221895 A1 Oct. 5, 2006

(30) Foreign Application Priority Data

Apr. 5, 2005 (JP) .............................. 2005-108360

(51) Int. Cl.
*H04B 7/00* (2006.01)
*H04W 4/04* (2009.01)
*H04N 7/18* (2006.01)

(52) U.S. Cl. ...................... 455/41.2; 455/431; 455/297; 725/74; 725/76

(58) Field of Classification Search ................. 370/328; 455/41.2, 98–99, 431, 297
See application file for complete search history.

(56) References Cited

U.S. PATENT DOCUMENTS

| 5,365,516 | A * | 11/1994 | Jandrell ....................... 370/335 |
| 5,880,867 | A | 3/1999 | Ronald |
| 6,414,955 | B1 | 7/2002 | Clare et al. |
| 6,584,318 | B2 | 6/2003 | Hakalin et al. |
| 6,757,712 | B1 * | 6/2004 | Bastian et al. ............... 709/206 |
| 7,496,361 | B1 * | 2/2009 | Mitchell et al. ............. 455/431 |
| 2002/0160773 | A1 * | 10/2002 | Gresham et al. ............. 455/431 |
| 2003/0002482 | A1 * | 1/2003 | Kubler et al. ................ 370/352 |
| 2004/0072579 | A1 | 4/2004 | Hottinen |
| 2004/0098745 | A1 * | 5/2004 | Marston et al. ................ 725/73 |
| 2004/0192188 | A1 * | 9/2004 | Dieudonne ................... 455/431 |
| 2004/0229607 | A1 * | 11/2004 | La Chapelle et al. ........ 455/431 |
| 2004/0242276 | A1 | 12/2004 | Kashiwagi et al. |
| 2005/0181723 | A1 * | 8/2005 | Miller et al. ................. 455/431 |

(Continued)

FOREIGN PATENT DOCUMENTS

JP 8-321799 12/1996

(Continued)

OTHER PUBLICATIONS

Supplementary European Search Report issued Jul. 31, 2009 in counterpart European Application No. 06730662.

(Continued)

*Primary Examiner*—Nick Corsaro
*Assistant Examiner*—Tangela T. Chambers
(74) *Attorney, Agent, or Firm*—Wenderoth, Lind & Ponack L.L.P.

(57) ABSTRACT

A wireless network system arranges a plurality of access points along the aisles in a vehicle having two or more aisles. The positions of the access points on the first aisle and the positions of the access points on the second aisle are arranged in a zigzag pattern. The distance between neighboring access points is thus great, and there is no signal interference between adjacent access points.

10 Claims, 6 Drawing Sheets

U.S. PATENT DOCUMENTS

2006/0014554 A1   1/2006   Gerlach

FOREIGN PATENT DOCUMENTS

| | | |
|---|---|---|
| JP | 11-127096 | 5/1999 |
| JP | 2000-13853 | 1/2000 |
| JP | 2000-287798 | 10/2000 |
| JP | 2001-231077 | 8/2001 |
| JP | 2006-506899 | 2/2006 |
| WO | 03/032503 | 4/2003 |
| WO | 2004/047373 | 6/2004 |

OTHER PUBLICATIONS

Cristina Niebla, Institute of Electrical and Electronics Engineers: "Coverage and capacity planning for aircraft in-cabin wireless heterogeneous networks" Vehicular Technology Conference, 2003, vol. 3, Oct. 6, 2003, pp. 1658-1662, XP010702157, ISBN: 978-0-7803-7954-1.

* cited by examiner

Fig.5

| CENTER FREQUENCY (GHz) | CHANNEL NUMBER |
|---|---|
| 5.18 | CH36 |
| 5.20 | CH40 |
| 5.22 | CH44 |
| 5.24 | CH48 |
| 5.26 | CH52 |
| 5.28 | CH56 |
| 5.30 | CH60 |
| 5.32 | CH64 |
| 5.745 | CH149 |
| 5.765 | CH153 |
| 5.785 | CH157 |
| 5.805 | CH161 |

WIRELESS NETWORK LOCATED WITHIN A VEHICLE CONTAINING ACCESS POINTS AND TERMINALS FOR WIRELESS COMMUNICATION

BACKGROUND OF THE INVENTION

1. Field of Technology

The present invention relates to a wireless network system having access points or base stations at least capable of wireless transmission and terminals at least capable of wireless reception in a vehicle having a plurality of aisles.

2. Description of Related Art

Constructing a system connecting a plurality of terminals to a network in a building or vehicle has typically involved laying at least as many wired conductors as terminals.

While this method offers the advantage of highly reliable communication, the time and cost required to lay the lines and the work involved in subsequent maintenance are significant drawbacks.

Networks that connect wirelessly to the terminals are now available and are increasingly common. Wireless networks offer the advantage of requiring less time for installation and maintenance than conventional wired networks, and are therefore also less expensive. Wireless networks also eliminate the weight of the wires and the space needed to lay the wires, and are therefore particularly advantageous when installed in transportation vehicles.

Reflection of the radio waves by obstacles produces a phase shift in the signal waves that results in fading because the phase-shifted signals are then merged and result in a weakened reception level. Fading causes a loss of reception packets (errors), and narrows the usable bandwidth.

The literature is also silent on how the access points should be located in a vehicle having multiple aisles.

The general positioning of access points is described in Japanese Unexamined Patent Appl. Pub. H8-321799, Japanese Unexamined Patent Appl. Pub. H11-127096, and Japanese Unexamined Patent Appl. Pub. 2000-13853, but these documents are silent on the location of access points in a vehicle.

The access points could be located at equidistant intervals from the front to the back inside the passenger cabin.

However, if the signal strength of the wireless signals output from the access points is increased so that the signals can reach both ends of the vehicle, the wireless signals from two adjacent access points located one behind the other will interfere with each other, and signal quality will drop.

SUMMARY OF THE INVENTION

To solve this problem the present invention provides a wireless network system that deploys a plurality of access points in a vehicle having a plurality of aisles so that there is no interference between access points and the bandwidth that can be used for wireless communication is not reduced.

The invention locates the access points above the aisles within the space of a vehicle having at least two aisles to suppress creating reflection waves, suppress interference between access points, and improve the usable bandwidth.

A first aspect of the invention is a wireless network having a plurality of access points capable of at least wireless transmission and a terminal capable of at least receiving wireless communication from the access points in a space having at least two aisles where the access points are disposed along the aisles. This wireless network system preferably locates the access points at positions where the distance between any two access points located on adjacent aisles is greater than the minimum distance between the aisles, thereby having the effect of suppressing interference between access points on adjacent aisles.

In a wireless network system according to a second aspect of the invention in which an access point is located on one aisle and another access point is located on an adjacent aisle, the access points that are closest to each other on adjacent aisles are located so that one access point is above the aisle and the other access point is below the aisle. The distance between access points on adjacent aisles is thus greater than if the access points are all above or below the aisles, and the likelihood of interference can be further reduced.

In a wireless network system according to a third aspect of the invention the frequency bands are set so that the frequency band used by access points on one aisle will not cause interference with the frequency band used by an access point installed on an adjacent aisle. The likelihood of interference between adjacent access points is thus substantially eliminated because the adjacent access points use different frequency bands.

A wireless network system according to a fourth aspect of the invention comprises a terminal located at each seat, an antenna connected to each terminal, and concentrates antennae from plural seats at one location. This arrangement affords a uniform, short distance from access point to antenna, and thus has the effect of enabling uniform, stable reception of wireless signals transmitted from the access point.

EFFECT OF THE INVENTION

When a wireless network system is installed in the space of a vehicle having at least two aisles with a plurality of access points or base stations disposed along the aisles, this invention reduces interference between access points and prevents a drop in the usable bandwidth.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 5 is a table showing the channels and frequency allocation using the IEEE 802.11a standard in the United States.

| Key to the figures | |
|---|---|
| 1 | airplane |
| 2 | server |
| 4 | switch |
| 6a-6e | relays |
| 8 | ceiling |
| 10 | floor panel |

-continued

Key to the figures

| | |
|---|---|
| 12, 14, 16 | seat groups |
| 18, 20, 22 | luggage compartments |
| 24 | receivers |
| A1-A15 | access points |
| P1, P2 | aisles |

DETAILED DESCRIPTION OF THE PREFERRED EMBODIMENTS

Preferred embodiments of a wireless network system according to the present invention are described below with reference to the accompanying figures.

Embodiment 1

Figure 1:
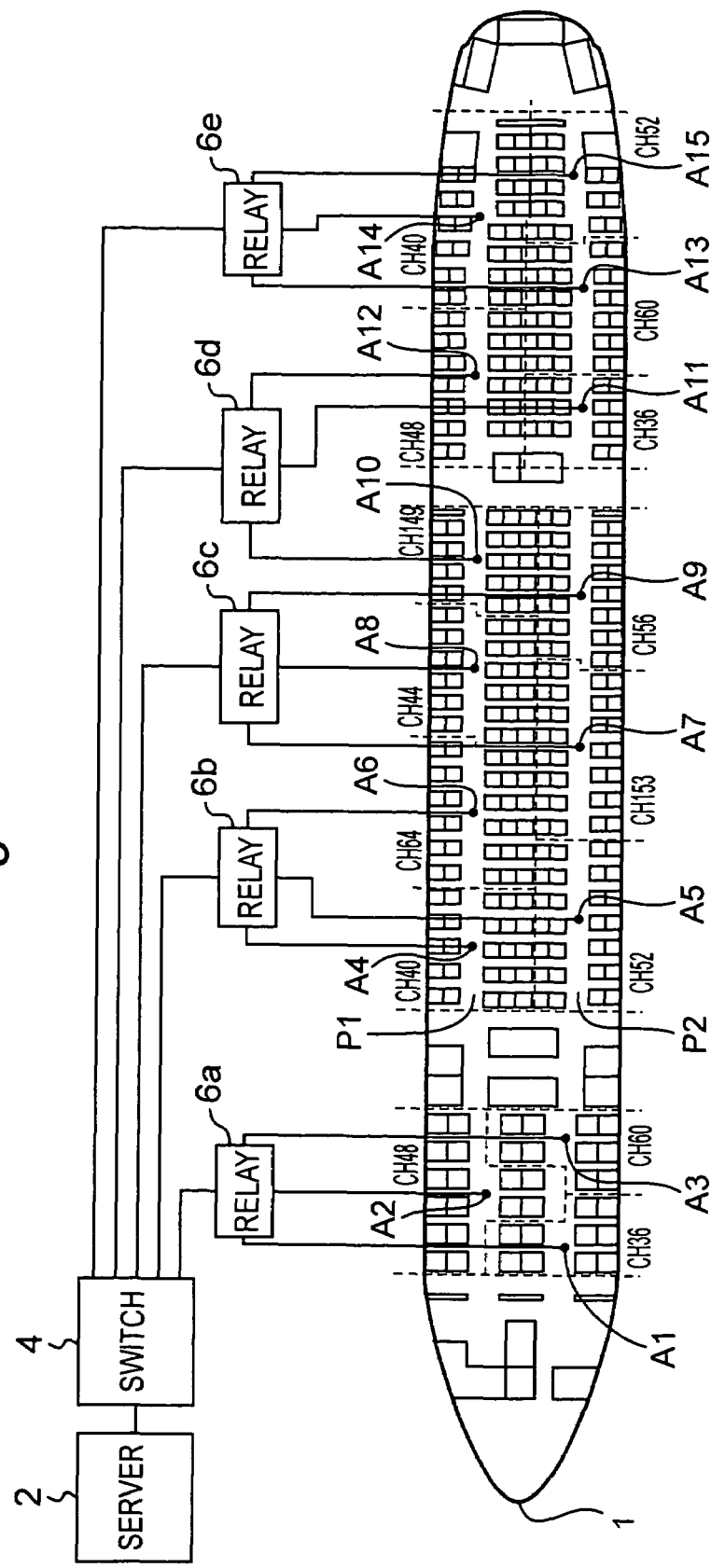
FIG. 1 shows the arrangement of a wireless network system deployed in a vehicle according to a first embodiment of the invention.

FIG. 1 shows the arrangement of a wireless network system according to the present invention when deployed in an airplane 1. Shown in FIG. 1 are the airplane 1, server 2, switch 4, relays 6a to 6e, and access points (also called base stations) A1 to A15. Groups of seats and aisles between the groups of seats are located inside the airplane 1. In this embodiment of the invention there are two aisles P1 and P2. In FIG. 1 access points A1, A2, and A3 are located in a first cabin area, and access points A4 to A15 are located in a second cabin area. The server 2, switch 4, and relays 6a-6e each comprise a wireless signal supply system or unit for supplying wireless signals.

The server 2 transmits crew announcements, music, movies, and other content in packet streams through the switch 4 to the relays 6a-6e, and from the relays 6a-6e to the access points. Each access point outputs radio frequency (RF) signals for the wireless network system on a predetermined frequency. These signals are received by the antenna (see FIG. 2) of the reception terminals located at each seat near the particular access point, thus enabling wireless communication between the terminal and access point. Each terminal can reproduce audio and video, and can send and receive control signals.

The closer a terminal antenna is to the access point, the greater the signal strength of the RF signals received by wireless communication, and reception signal strength gradually decreases with distance from the access point. The terminal antennae can be located at each seat. The antennae for a plurality of seats located in the same row can also be concentrated in one location, such as at the end of the row closest to the access point. Alternatively, the antenna for a plurality of seats in a plurality of rows can be similarly concentrated in one location.

In the embodiment shown in FIG. 1 the ranges of seats associated with each access point A1-A15 are indicated by the dotted lines in the figure.

Table 1 shows the wireless channel used by each of the access points A1-A15.

TABLE 1

| Access point | Channel |
|---|---|
| A1 | CH36 |
| A2 | CH48 |
| A3 | CH60 |
| A4 | CH40 |
| A5 | CH52 |
| A6 | CH64 |
| A7 | CH153 |
| A8 | CH44 |
| A9 | CH56 |
| A10 | CH149 |
| A11 | CH36 |
| A12 | CH48 |
| A13 | CH60 |
| A14 | CH40 |
| A15 | CH52 |

The channels shown in this table are based on the IEEE 802.11a wireless LAN standard and are the channels that can be used in the United States. The channels of the IEEE 802.11a LAN standard and the center frequency of each channel are shown in FIG. 5.

When multiple access points are used, interference occurs when adjacent access points use nearby channels, and the usable bandwidth thus decreases. Whether or not interference occurs depends on channel proximity and the distance between the access points, and is not dependent on just one of these conditions. Even if two access points use the same channel, interference will not occur if there is sufficient distance between the access points or the effective ranges of the access points do not overlap as further described below. Conversely, if the distance between access points is extremely short, signal interference between the multiple access points is hard to avoid even if the channel distance between the assigned channels is one or two channels.

The relationship between the distance between access points and the channel distance depends on the characteristics of the space in which the service is provided, therefore cannot be determined uniformly for all situations, and must be determined from measurements taken in the communication environment. The distance between the channels used by adjacent access points is two channel slots in this embodiment of the invention.

As shown in Table 1, access point A1 uses channel CH36 and access point A2 uses channel CH48. As will be known from the table shown in FIG. 5, there are two other channels between channel CH36 and channel CH48. The channels used by adjacent access points are preferably separated by two or more channels. By thus separating the channels used by adjacent access points by two channel slots, the likelihood of interference can be reduced and a drop in the quality of the usable bandwidth can be prevented.

Location of the access points is described next.

Figure 2:
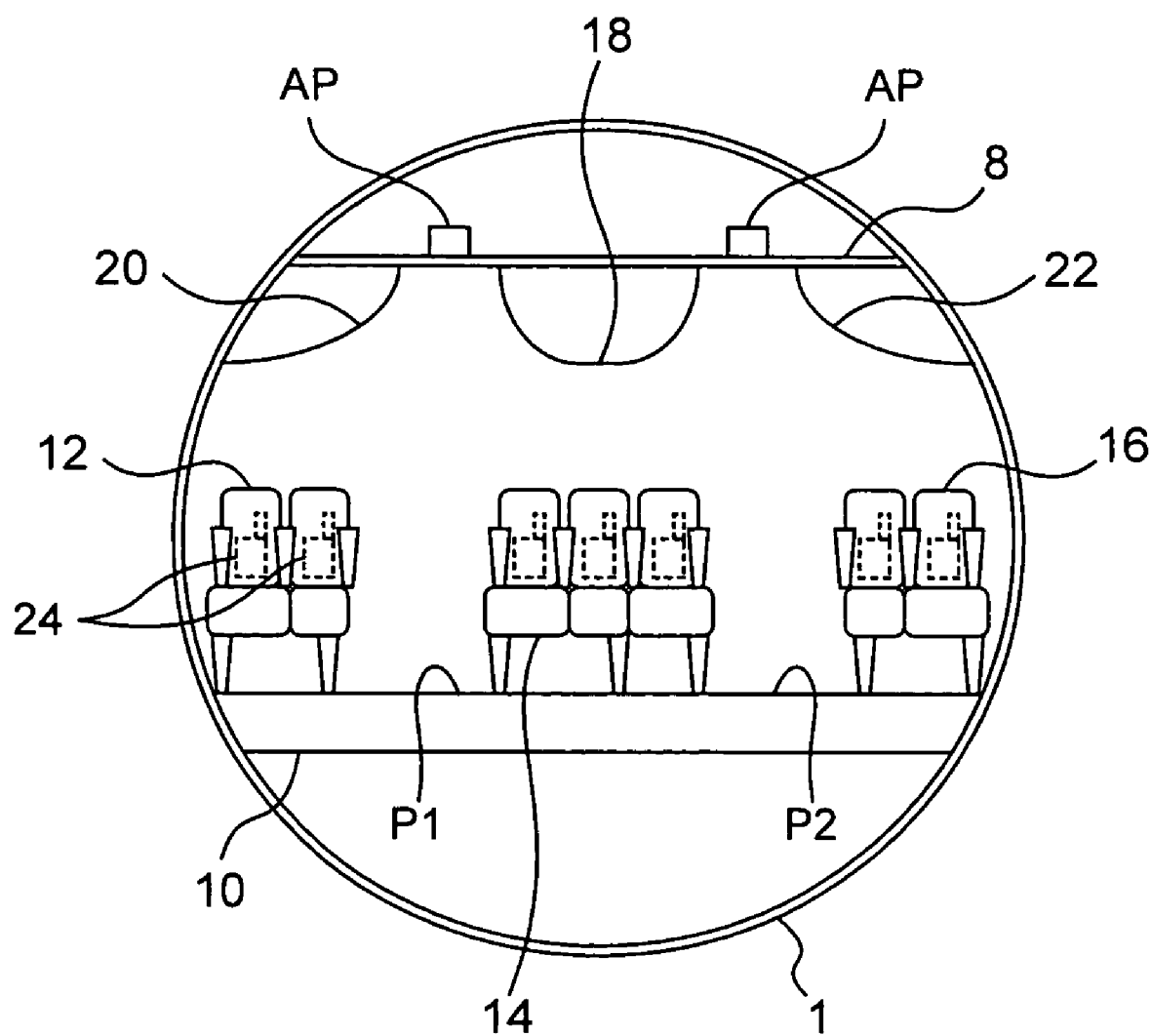
FIG. 2 is a section view of the vehicle.

FIG. 2 is a section view of the airplane 1. The seat groups are segmented into a middle seat group 14, a first window seat group 12, and a second window seat group 16. Each seat group is fastened to the floor panel 10. A ceiling 8 is provided above the seat groups. A middle luggage compartment 18, a first window luggage compartment 20, and a second window luggage compartment 22 are disposed on the front (seat side) of the ceiling 8 with the middle luggage compartment 18 above the middle seat group 14, the first window luggage compartment 20 above the first window seat group 12, and the second window luggage compartment 22 above the second window seat group 16. A first aisle P1 separates the first window seat group 12 and middle seat group 14, and a second aisle P2 separates the middle seat group 14 and second window seat group 16.

Access points AP are located in the ceiling 8 above aisle P1, and access points AP are also located in the ceiling 8 above aisle P2. The access points AP are preferably installed behind the ceiling 8, but the access points AP can be installed on the front (seat side) of the ceiling 8 or embedded in the ceiling 8 if the ceiling 8 has multiple layers.

A receiver 24 comprising a terminal and an antenna is assembled in each seat. As described above the antennae can be disposed in each seat, or antennae for a plurality of seats can be concentrated in one location such as at the aisle end of a row of seats. Concentrating the antennae in one location enables locating the antennae closer to the access point.

Figure 3:
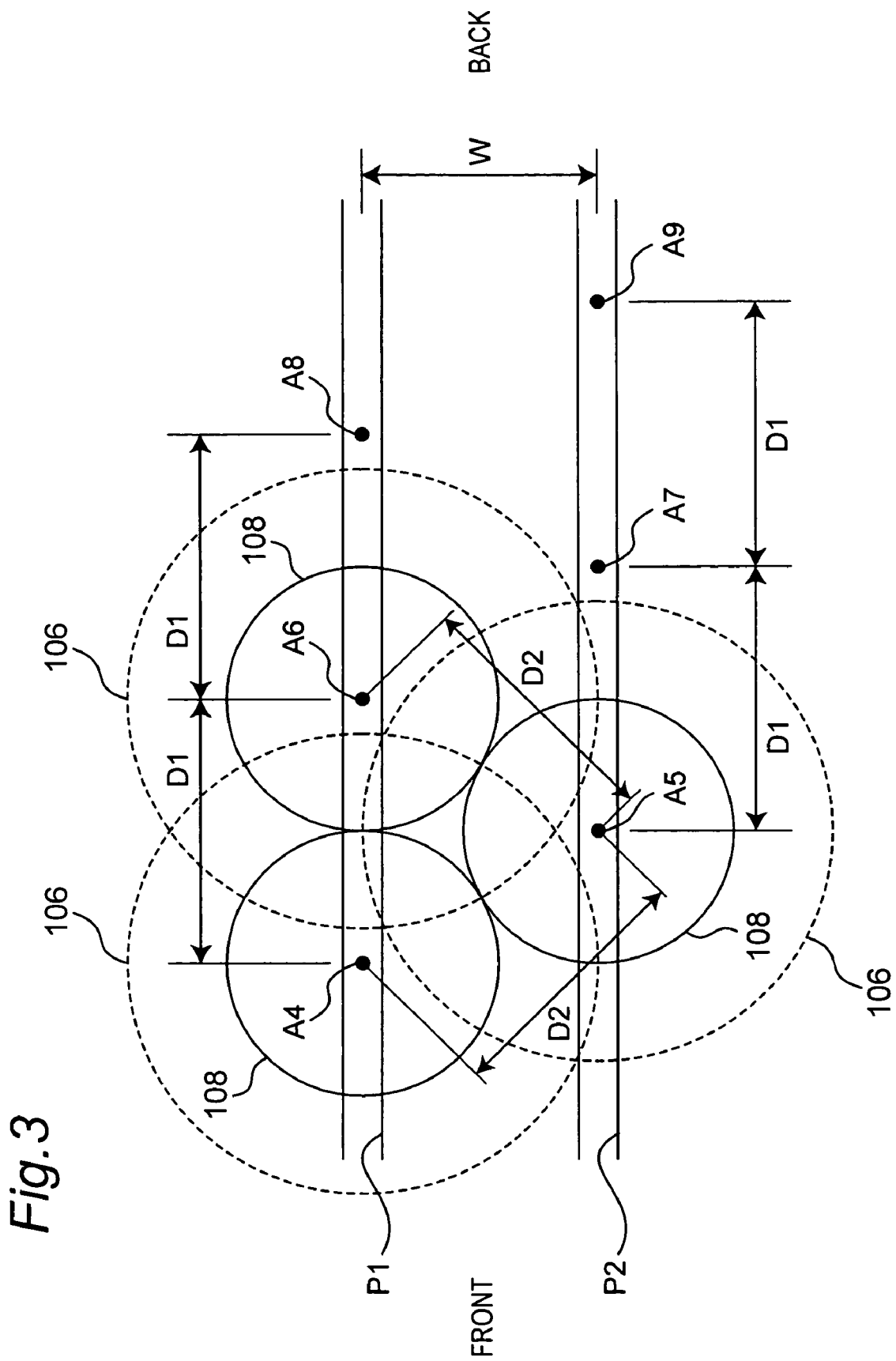
FIG. 3 illustrates the relative positions of the access points.

FIG. 3 is a top plan view of a part of the second cabin area having two aisles P1, P2, and shows the location of access points A4, A5, A6, A7, A8, A9. Access points A4, A6, A8 are disposed at substantially equidistant interval D1 along aisle P1, and access points A5, A7, A9 are disposed at substantially equidistant interval D1 along aisle P2. The distance D2 between an access point on one aisle (access point A4 on aisle P1 in this example) and the access point on the other aisle closest to the access point on the first aisle (access point A5 on aisle P2 in this example) is greater than or equal to D1. If the distance W between the aisles P1, P2 is less than D2, access points A4 to A9 will be located in an alternating or zigzag pattern when seen in plan view as shown in FIG. 3.

The circular areas 106 indicated by dotted lines in FIG. 3 denote the effective communication range of the access point at the center of each area 106, that is, the range in which signals transmitted from a particular access point can be effectively received by the receiver antenna at each seat. The areas 106 indicated by the dotted lines overlap, but because adjacent access points operate on different channels, the receivers are not subject to signal interference.

If adjacent access points use the same channel or channels with close frequency bands, the effective communication range is limited to the circular areas 108 denoted by solid lines in FIG. 3 in order to prevent interference with signals from adjacent access points.

If an antenna is provided at each seat, or antennae from a small number of plural seats are gathered together, the effective communication range is set as indicated by the dotted line areas 106, but if antennae from a large number of seats are concentrated together, the effective communication range can be set as indicated by the solid line areas 108.

Arranging the access points in a zigzag pattern as shown in FIG. 3 enables arranging the effective communication ranges of the access points efficiently.

The access points are located in the ceiling above the aisles because there are few obstructions on the aisles, signal reflection can be suppressed, and narrowing the effective range can be prevented.

The effective range 106 may be noncircular depending on the presence of obstacles and other factors. Furthermore, if the access points use channels with the same or close frequency, this effective range 106 is reduced (to near range 108), but if the channel separation is greater, this effective range 106 is increased.

Furthermore, the access points are not limited to being installed at the ceiling 8, and could be installed at the floor 10. If the access points are installed at the floor, the access points are still installed in the same zigzag pattern used for a ceiling 8 installation, thus affording the same effect.

As described above, if the distance W between adjacent aisles P1, P2 is less than the distance D1 between adjacent access points along the aisle, signal interference between adjacent access points can be suppressed by locating the access points so that the distance D2 between access points on adjacent aisles is greater than or equal to the shortest distance W between the aisles P1, P2.

More specifically, if the left side in FIG. 3 is the front of the parallel aisles P1, P2, that is, is at the front of the airplane 1, and the right side is the end of the aisles P1, P2, that is, is the back of the airplane 1, access point A5 on adjacent aisle P2 is located towards the back of the aisle relative to the position of access point A4 on the first aisle P1 so that access points A4 and A5 are not at the same position in the direction going across the aisles (that is, are not located at substantially the same seat row). In other words, when seen in plan view from above, access points A2, A4, and A6 on first aisle P1 and access points A5, A7, A9 on the second aisle P2 are offset from each other in a zigzag pattern. By thus positioning the access points the effective communication ranges 108 of access points A4 and A5 do not overlap, and if effective ranges 106 overlap, the overlapping portion is minimized. The access points can therefore be used most efficiently.

The next access point A6 on aisle P1 is likewise offset towards the rear of the airplane from the access point A5 on the other aisle P2 so that the effective signal ranges of access points A5 and A6 do not overlap or the overlap is minimal. Further preferably, the access point A5 on one aisle P2 is located at the midpoint between the two neighboring access points A4 and A6 on the other aisle P1.

This embodiment of the invention has been described with reference to access points A4, A5, A6, A7, A8, and A9, but the other access points A1 to A3 and A10 to A15 are similarly disposed and have the same effect. This also applies to the other embodiments described below.

As will be known from the foregoing description, the present invention suppresses signal interference between a plurality of access points and prevents a loss of usable bandwidth when a plurality of access points is installed in a space having at least two aisles.

It will also be obvious that when the access points are arranged as described above, distance D1 is the distance required to prevent signal interference between the plural access points disposed on the same aisle P1 or P2.

Embodiment 2

Figure 4:
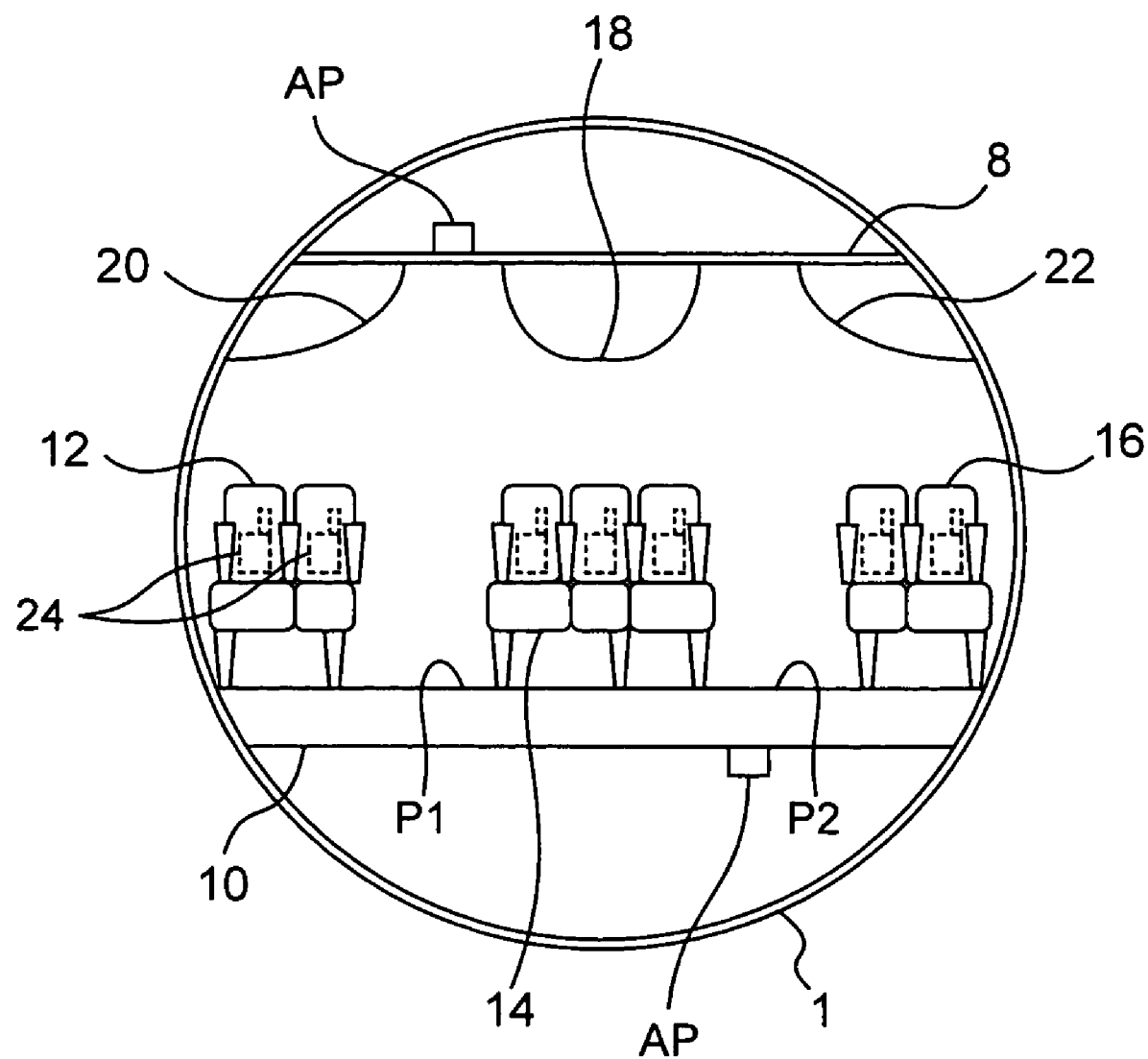
FIG. 4 is a section view of a vehicle in which a wireless network system according to a second embodiment of the invention is deployed.

FIG. 4 is a section view describing a second embodiment of the invention.

In the first embodiment shown in FIG. 2 all access points are located at the ceiling 8. In the second embodiment shown in FIG. 4, however, the access points positioned along one aisle, such as aisle P2 in this example, are located at the floor panel 10, such as underneath the floor, and the access points on the other aisle P1 are located in the ceiling 8. Described with reference to the arrangement shown in FIG. 3, the access points A4, A6, A8 located along aisle P1 are disposed to the ceiling 8, and the access points A5, A7, A9 located along aisle P2 are disposed to the floor 10.

By arranging the access points as shown in FIG. 4, the distance between access points on adjacent aisles is greater than when all access points are located at the ceiling 8 or at the floor 10, and interference between access points can be further suppressed.

While the access points along aisle P1 are in the ceiling 8 and the access points along aisle P2 are at the floor 10 in FIG. 4, this arrangement can obviously be reversed.

FIG. 4 shows the relationship between access points on aisles P1, P2 separated by the middle seat group 14, but access points disposed along the same aisle can also be alternately disposed at the ceiling 8 and floor 10, thereby increasing the distance between access points on the same aisle. Described with reference to FIG. 3, this arrangement places the access points A4, A6, A8 on one aisle P1 at the floor 10, ceiling 8, and floor 10, respectively, and the access points A5, A7, A9 on the other aisle P2 at the floor 10, ceiling 8, and floor 10, respectively. Signal interference between neighboring access points can thus be suppressed by disposing access points along the same aisle in a zigzag pattern when seen from the side because the distance between adjacent access points is greater than when the access points along the same aisle are disposed in a straight line.

Embodiment 3

Figure 6:
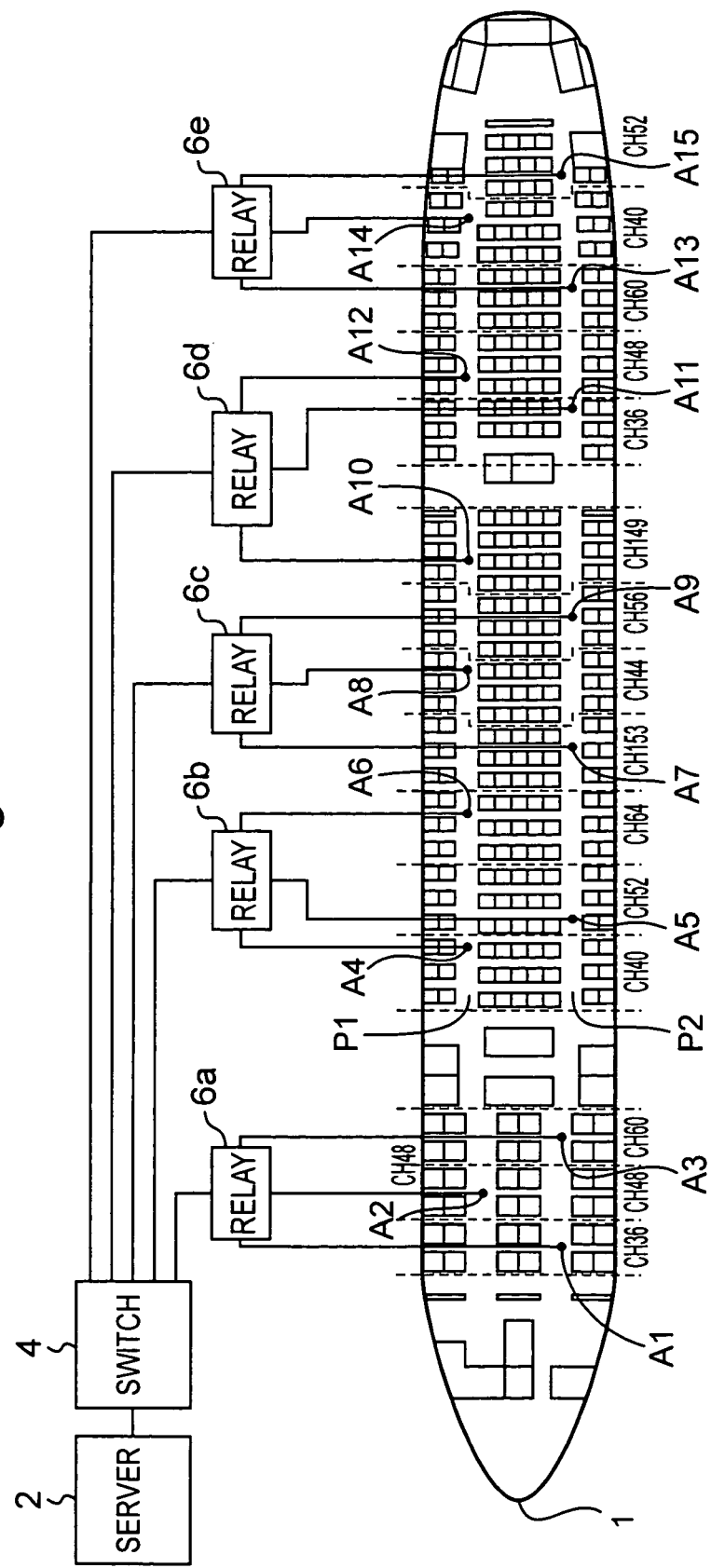
FIG. 6 shows the arrangement of a wireless network system deployed in a vehicle according to a third embodiment of the invention.

FIG. 6 describes a third embodiment of the invention.

With the access points shown in the first embodiment of the invention the transmitted signals are non-directional. The access points in this third embodiment of the invention use directional antennae. Access point A4, for example, has directivity transmitting transversely to aisles P1, P2. The other access points have similar directivity. The seat range covered by the directivity of each access point A1 to A15 is denoted by the dotted lines in FIG. 6. These ranges are longer than the ranges shown in FIG. 1. This arrangement enables increasing transmission signal strength while reducing interference with signals longitudinally (in the same direction as the aisles).

A variation of this embodiment orients the directivity of the access points in the same direction as the aisles. This arrangement reduces interference between signals transmitted from access points along aisle P1 and signals transmitted from access points along aisle P2.

If the airplane has two decks, the access points disposed in the ceiling of the second deck are arranged in a zigzag pattern, and the access points disposed in the ceiling of the first deck are also arranged in a zigzag pattern. When seen in a plan view, the zigzag pattern of the access points on the first deck can overlap the zigzag pattern of the access points on the second deck, or can be offset along the center axis of the airplane. In the latter case the first deck zigzag pattern is preferably line symmetric to the zigzag pattern of access points on the second deck. This arrangement can further reduce interference between access points on the first and second decks.

The invention is described above using an airplane as an example of the vehicle, but the vehicle could be a ship, a land vehicle, or any other vehicle having two or more aisles.

A wireless network system according to the present invention renders a plurality of access points along a plurality of aisles, and has the effects described below.

(1) Arranging, for example, ten access points in two rows instead of one row increases the distance between access points. As a result, interference between access points can be reduced.

(2) Arranging the access points in two rows instead of one row enables transmitting wireless signals more uniformly crosswise, particularly near the windows.

(3) Considering the side to side weight balance of the airplane, disposing the access points in two rows enables more effectively balancing the aircraft than disposing the access points in one row down the center.

(4) Arranging the access points in a zigzag pattern increases the distance between neighboring access points on adjacent aisles, and reduces interference between the access points.

APPLICATION IN INDUSTRY

The present invention can be used in a wireless network system.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. A wireless network disposed in a vehicle having a longitudinal direction, comprising:
   at least a first aisle and a second aisle parallel to the first aisle, the first and second aisles extending along the longitudinal direction of the vehicle;
   a plurality of seat groups comprising a center seat group, a first window side seat group separated from the center seat group by the first aisle and a second window side seat group separated from the center seat group by the second aisle;
   a wireless signal supply unit configured to supply wireless signals;
   a plurality of first access points disposed in the longitudinal direction above the first aisle and configured to transmit the wireless signals from the wireless signal supply unit;
   a plurality of second access points disposed in the longitudinal direction above the second aisle and configured to transmit the wireless signals from the wireless signal supply unit;
   wherein the positions of the first access points alternate in the longitudinal direction with the positions of the second access points, such that the first and second access points form a zigzag pattern extending along the longitudinal direction of the vehicle when viewed from above.

2. A wireless network disposed in a vehicle as described in claim 1, wherein the first access points disposed above the first aisle and the second access points disposed above the second aisle are all disposed in the ceiling above the first and second aisles, respectively.

3. A wireless network disposed in a vehicle as described in claim 1, wherein the first aisle includes a floor and the second aisle includes a floor and wherein a plurality of third access points is disposed along the floor of the first aisle and a plurality of fourth access points is disposed along the floor of the second aisle.

4. A wireless network disposed in a vehicle as described in claim 1, wherein the first aisle includes a floor and the first access points disposed above the first aisle are disposed in the ceiling above the first aisle and a plurality of third access points is disposed along the floor of the second aisle, or wherein the second aisle includes a floor and a fourth plurality of access points is disposed along the floor of the first aisle and the second access points disposed above the second aisle are disposed in the ceiling above the second aisle.

5. A wireless network disposed in a vehicle as described in claim 1, wherein
   the first aisle includes a floor and the second aisle includes a floor;

wherein a plurality of third access points is disposed along the floor of the first aisle and a plurality of fourth access points is disposed along the floor of the second aisle;

wherein the first access points are disposed in the ceiling of the first aisle and the second access points are disposed in the ceiling of the second aisle; and wherein the first access points are alternatively disposed in the longitudinal direction with the third access points and the second access points are alternatively disposed in the longitudinal direction with the fourth access points.

6. A wireless network disposed in a vehicle as described in claim 1, wherein the first access points include at least a first access point and a second access point disposed adjacent the first access point, and the second access points include at least a third access point disposed adjacent the first access point, and wherein the first access point has a different channel frequency than at least one of the second and third access points.

7. A wireless network disposed in a vehicle as described in claim 1, wherein the first access points include at least a first access point and a second access point disposed adjacent the first access point, and the second access points include at least a third access point disposed adjacent the first access point, and wherein the first, second and third access points each have a channel frequency assigned thereto, and the channel frequency assigned to the first access point is the same as the channel frequency assigned to at least one of the second and third access points.

8. A wireless network disposed in a vehicle as described in claim 1, wherein each of the seat groups comprises a plurality of seats, and for each of the seat groups, terminal devices are disposed at the seats, respectively; and at least one antenna configured to receive the wireless signals is connected to the terminal devices of each of the seat groups.

9. A wireless network disposed in a vehicle as described in claim 8, wherein, for each of the seat groups, said at least one antenna includes a plurality of antennas disposed on the seats, respectively.

10. A wireless network disposed in a vehicle as described in claim 8, wherein, for each of the seat groups, said at least one antenna includes a plurality of antennas disposed in one location.

\* \* \* \* \*